United States Patent Office 3,554,787
Patented Jan. 12, 1971

3,554,787
GLASS ARTICLE HAVING DUAL SCRATCH AND ABRASION RESISTANT COATING AND METHOD FOR PRODUCING SAME
Charles E. Plymale, Maumee, Ohio, assignor to Owens-Illinois, Inc., a corporation of Ohio
No Drawing. Filed Aug. 16, 1965, Ser. No. 480,098
Int. Cl. C03c 17/32
U.S. Cl. 117—72    7 Claims

ABSTRACT OF THE DISCLOSURE

Glass surfaces are provided with abrasion-resistant characteristics by forming a first layer of an oxide of tin or titanium thereon and then overcoating this first layer with organic copolymers. Suitable copolymers include copolymers of vinyl acetate with vinyl chloride, vinyl acetate with vinyl benzoate, ethylene with vinyl acetate, vinyl acetate with dibutyl fumurate, vinyl acetate with methyl methacrylate, ethyl acrylate with methacrylic acid and ethylene with ethyl acrylate.

---

The present invention pertains to surface coating materials for glass surfaces. In particular, the present invention relates to a process for improving the scratch resistance of glass surfaces. A particular aspect of this invention relates to improved abrasion resistant glass coatings which have good printability without further treatment.

Glass derives its strength from an unblemished surface and any scratches or flaws which are present on its surface decrease its strength down to a little as one-fourth of its original value. Generally, glass articles of commerce, such as jars, bottles, tumblers and the like have their maximum strength as soon as they are formed and this strength decreases as the articles of commerce come into contact with each other and with other surfaces in the course of manufacturing, packaging, filling and shipping.

It will be appreciated that if the glass surface is coated with a composition having good wet and dry scratch resistance or abrasion resistance properties, which by imparting said scratch resistance decreases the likelihood of breakage, more bottles can be handled by the filling and packaging apparatus in the same amount of time merely by spacing the bottles closer together and by increasing the speed of the conveyors, even though the glass surface will be subject to more contact with other surfaces. Also, since many products are packaged under pressure, for example, carbonated beverages, it is very desirable that the surface of the glass container have as few scratches as possible to minimize the possibility of breakage.

It will be further appreciated, by those knowledged in the art, that if the glass surface is coated with a composition to which labels readily adhere and which also has good printability without further treatment, said compositions would represent a substantial contribution to the art.

Attempts have been made in the past to increase the strength of glass surfaces by coating said surface with a polyethylene coating. While polyethylene does produce a good coating, its inherent hydrophobic nature makes it poor surface for adhering labels, inks and decorations. Surprisingly, it has now been found that by using copolymers which possess increased polarity in reference to the respective monomer, it is possible to overcome the disadvantages associated with the prior art. That is, the copolymers employed herein increase the scratch resistance of the glass surface and also are receptive to printing inks and labels.

Accordingly, it is an object of the instant invention to provide an abrasion resistance coating composition which will afford protection against abrasive action.

It is a further object of this invention to provide a thin substantially transparent coating on a glass surface which coating is highly resistant to abrasion while simultaneously substantially maintaining the strength characteristics of the glass.

Still another object of this invention is to provide a method for coating surfaces, such as the exterior of a glass container, so as to impart thereto scratch resisting properties, thus permitting the container to undergo normal handling, processing and shipping with the consequent rubbing of the glass surface with other surfaces, without materially decreasing the strength of the container.

Still a further object of this invention is to provide a coating for glass surfaces which coating has adequate printability without further treatment.

In obtaining the objects of this invention, one feature resides in treating a glass surface with a titanium or tin compound which is pyrolyzable, that is, chemically decomposed by the action of heat to form oxides of the metal on the glass surface while the surface is at a temperature above the pyrolyzing temperature of the compound, cooling the treated glass, such as in an annealing lehr, and applying to said cooled surface a second coating composition, which latter coating contains a copolymer.

In carrying out the instant invention, the glass article of commerce is first treated soon after the article leaves the glass forming machine and as it is being conveyed to the annealing lehr. A solution of the pyrolyzable compound is sprayed onto the exterior surface of the glass at a temperature above the pyrolyzing temperature of the compound. The pyrolyzing temperature for titanium and tin compounds is between about 700° F. and 1300° F., depending upon the particular compound used, with the preferred range being from about 900° to 1200° F.

The titanium compound employed in this invention is one which upon contact with the heated glass surface will react to form titanium oxide. Among the titanium compounds suitable for the purpose of this invention are volatile metallo-organic compounds such as the alkyl titanates, preferably where the alkyl group has from 1 to 8 carbon atoms. Among the alkyl titanates that may be used are tetrabutyl titanate, tetraisopropyl titanate, tetrakis(2-ethylhexyl)titanate, tetramethyl titanate, tetraethyl titanate and the like. Also included among the suitable titanium containing compounds are the titanium tetrahalides and particularly titanium tetrachloride. Ammonium salts of titanium lactate are also suitable.

The tin compounds that may be used for the purpose of the present invention include stannic salts among which are the halides such as stannic chloride. Other stannous compounds include the salts of fatty acids such as oleate, stearate, palmitate and the like.

As the glass article, now coated with a thin layer, enters the annealing lehr, they are progressively cooled over a period of time to about 400° F. and lower, where they are sprayed with a second coating containing a copolymer. Among the copolymers that may be employed for the purpose of this invention are vinyl ester copolymers.

Generally, the copolymer resins that may be employed herein are those that are unaffected by light or air and show no visible signs of discoloration. Also, because of the polar nature of the instant copolymers, the resins are receptive to printing links. Among the commercially available copolymers that may be employed for the purpose of this invention are the vinyl ester copolymers, such as copolymer vinyl acetate with vinyl chloride, copolymer vinyl acetate with vinyl benzoate, copolymer vinyl acetate with ethylene, copolymer vinyl salicylate with ethylene, copolymer vinyl acetate with dibutyl fumarate copolymer vinyl acetate with methyl methacrylate, copolymer ethyl acrylate with methacrylic acid, copolymer of ethylene with ethyl acrylate and the like. The percentage of the monomers within the copolymer may vary over a wide range and the following examples are given merely for the purpose of illustration, and are not to be construed as limiting. As examples may be cited copolymer 70% vinyl acetate with 30% vinyl chloride, copolymer 85% vinyl acetate with 15% vinyl benzoate, copolymer containing 14% vinyl acetate and 86% ethylene, copolymer 30% vinyl acetate with 70% ethylene, copolymer 27% vinyl acetate with 73% ethylene, copolymer ethylene with ethyl acrylate containing from about 10 to about 40% ester, and the like may be used to produce coatings which have good scratch resistance and printability properties.

The above objects, features, advantages and examples are not to be construed as limiting the instant invention as these and other features will become apparent to those skilled in the art. The following examples are merely illustrative of the mode and manner of carrying out the present invention and should not be considered limiting its scope in any way.

EXAMPLE I

A tetraisopropyl titanate solution consisting of one part by volume of titanate and one part by volume of anhydrous isopropyl alcohol was prepared by dissolving the titanate at room temperature in the solvent. The solution thus obtained was sprayed onto the exterior surface of glass bottles at the rate of 0.4 gallon per hour.

EXAMPLE II

A one to one tetraisopropyl titanate isopropyl alcohol was prepared as immediately above. The solution was sprayed onto the exterior surfaces of glass bottles at the rate of 0.5 gallon per hour.

EXAMPLE III

An emulsion of copolymer vinyl acetate with ethylene, (27% vinyl acetate, 50% solids with 97% below 1 micron, melt index of about 139, U.S.I. Chemical Co.), was prepared by mixing 10 milliters of the copolymer with 990 milliters of water. The aqueous emulsion was sprayed onto the exterior surfaces of glass bottles at the rate of 1–2 gallons per hour. The temperature of the surface of the bottles was about 300° F. The copolymer was sprayed onto the surface of bottles that were previously coated and onto the surface of uncoated bottles.

Bottles treated in accordance with the foregoing examples were tested with a scratch test machine to evaluate the effectiveness of the respective coatings. The scratch test machine is designed to abrade the surface of one glass against the surface of a similar bottle. One bottle is fastened securely in a stationary lower set of chucks. The other bottle is fastened in an upper set of chucks which are positioned so that the axis of the bottles will be at 90° to each other. The test load is applied to the upper bottle which is driven at a constant speed of 2.8 inches per minute in a direction of 45° to the axis of each bottle. The actual rate of scratch propagation on the bottles is then 2 inches per minute.

By this design, a fresh surface on one bottle is always contacted with a fresh surface of the other. Since the base of each bottle extends in the direction of motion, the scratch is propagated from the shoulder to the base. This permits the detection of poor scratch protection in a particular section of the ware since identical sections of each bottle are contacted.

The force exerted by the second bottle is a known measured force, and after each pass, the bottles are examined for scratches. The force or load in pounds was measured with respect to the scratch resistance of the dry bottles, which were wetted with water, that is, the test machine can be filled with water and the scratch evaluation performed with the contacting surfaces submerged. These test results are reported as wet scratch protection. The scratch protection was also measured with bottles which had been subjected to a caustic wash comprising a 5% NaOH aqueous solution at a temperature of 150° F. for a period of one-half hour. The results of the tests performed are set forth below.

TABLE 1.—NUMBER OF POUNDS TO PRODUCE SCRATCH

|  | Dry | Wet | After caustic wash Dry | Wet |
|---|---|---|---|---|
| Uncoated bottles | 2 | 3 | 2 | 5 |
| Titanate alone | 2 | 2 | 7 | 4 |
| Copolymer VAc-Et. alone | 5 | 5 | 10 | 10 |
| Titanate and copolymer | 85 | 5 | 85 | 30 |

In Table 1, the titanate was sprayed at the rate of 0.4 g.p.h.

The above results are seen to demonstrate the unexpected advantages produced by overcoating a previously coated bottle with a copolymer.

Another property that has been measured to demonstrate the characteristics of the instant invention is lubricity. Lubricity is measured by determining the angle at which the top bottle in a pyramid of three bottles, on their sides, will start to slide when the support is tilted. What is measured is the starting friction or the angle of repose. The tangent of the angle of repose is the coefficient of friction when motion is impending, which value is inversely related to the lubricity of the glass surface. Untreated bottles will reach an angle of 35 to 40° before sliding. A good lubricious surface will permit a dry bottle to slide at about 6 to about 8°. Bottles are run dry and wet, before and after caustic, as in the scratch test. The results of these tests are presented below:

TABLE 2.—NUMBER OF POUNDS TO PRODUCE SCRATCH

|  | Dry | Wet | After caustic wash Dry | Wet |
|---|---|---|---|---|
| Untreated bottles | 2 | 3 | 2 | 5 |
| Titanate alone | 2 | 2 | 7 | 4 |
| Copolymer alone | 10 | 10 | 10 | 10 |
| Titanate plus copolymer | 100 | 40 | 100 | 55 |

TABLE 3.—LUBRICITY

|  | Dry | Wet | After caustic wash Dry | Wet |
|---|---|---|---|---|
| Untreated Bottles | 35 | 40 | 40 | 40 |
| Titanate alone | 35 | 40 | 40 | 40 |
| Copolymer alone | 12 | 33 | 12 | 30 |
| Titanate plus copolymer | 10 | 14 | 10 | 13 |

In Tables 2 and 3 the titanate was sprayed at the rate of 0.5 g.p.h.

The results presented above demonstrate the unobvious results which are obtained by the present invention. In addition to these unobvious results, the present surfaces have printability properties, that is, receptive to inks, without any further treatment.

Obviously, many modifications and variations of the instant invention are possible in the light of the above teachings. It is, therefore, to be understood that within the scope of the appended claims, the invention may be practiced otherwise than as previously described.

I claim:

1. In a method for increasing the scratch and abrasion resistance of a glass surface wherein pyrolyzable tin or titanium compounds are applied to a hot glass surface to form a tin or titanium oxide layer thereon and then an organic material is sprayed onto said oxide layer, the improvement wherein said organic material comprises a label accepting copolymer of about 14 to 30 percent vinyl acetate with 70 to 86 percent ethylene.

2. As an article of manufacture, a coated glass article having a tin oxide or titanium oxide layer directly adhered to the surface of said glass article and a copolymer of vinyl acetate with ethylene directly adhered to said oxide layer, said copolymer comprising about 14 to 30 percent vinyl acetate and about 70 to 86 percent ethylene, said coated article being scratch and abrasion resistant and receptive to labels and printing inks.

3. The article of claim 2 wherein said copolymer comprises about 27% vinyl acetate.

4. The article of claim 2 wherein said copolymer comprises about 14 percent vinyl acetate.

5. The article of claim 2 wherein said copolymer comprises about 30% vinyl acetate.

6. In a method for increasing the scratch and abrasion resistance of a glass surface wherein pyrolyzable tin or titanium compounds are applied to a hot glass surface to form a tin or titanium oxide layer thereon and then an organic material is sprayed onto said oxide layer, the improvement wherein said organic material comprises a label accepting copolymer selected from the group consisting of a copolymer of vinyl acetate with vinyl chloride, a copolymer of vinyl acetate with vinyl benzoate, a copolymer of ethylene with 14 to 30 percent vinyl acetate, a copolymer of vinyl acetate with dibutyl fumarate, a copolymer of vinyl acetate with methyl methacrylate, a copolymer of ethyl acrylate with methacrylic acid, and a copolymer of ethylene with about 10–40 percent ethyl acrylate.

7. As an article of manufacture, a coated glass article having a tin oxide or titanium oxide layer directly adhered to the surface of said glass article and a label-accepting copolymer selected from the group consisting of a copolymer of vinyl acetate with vinyl chloride, a copolymer of vinyl acetate with vinyl benzoate, a copolymer of ethylene with 14 to 30 percent vinyl acetate, a copolymer of vinyl acetate with dibutyl fumarate, a copolymer of vinyl acetate with methyl methacrylate, a copolymer of ethyl acrylate with methacrylic acid, and a copolymer of ethylene with about 10–40 percent ethyl acrylate adhered directly to said oxide layer.

References Cited
UNITED STATES PATENTS

| | | | |
|---|---|---|---|
| 2,400,139 | 5/1946 | Roland | 161—203 |
| 3,382,092 | 5/1968 | Ilnyckyj et al. | 117—161(UIC)X |
| 3,420,693 | 1/1969 | Scholes et al. | 117—124X |
| 3,285,802 | 11/1966 | Smith et al. | 117—72X |
| 3,323,889 | 6/1967 | Carl et al. | 117—72X |
| 3,352,707 | 11/1967 | Pickard | 117—72 |
| 3,352,708 | 11/1967 | Lyon et al. | 117—72 |

ALFRED L. LEAVITT, Primary Examiner

U.S. Cl. X.R.

117—94, 124